US006895068B2

(12) United States Patent
Hartel et al.

(10) Patent No.: US 6,895,068 B2
(45) Date of Patent: May 17, 2005

(54) METHOD FOR PROVIDING A PRESSURIZED FLUID

(75) Inventors: Werner Hartel, Hamburg (DE); Johann Meseth, Dieburg (DE)

(73) Assignee: Framatome ANP GmbH, Erlangen (DE)

(*) Notice: Subject to any disclaimer, the term of this patent is extended or adjusted under 35 U.S.C. 154(b) by 0 days.

(21) Appl. No.: 10/614,569

(22) Filed: Jul. 7, 2003

(65) Prior Publication Data

US 2004/0017877 A1 Jan. 29, 2004

Related U.S. Application Data

(62) Division of application No. 09/632,355, filed on Aug. 3, 2000, now abandoned, which is a continuation of application No. PCT/DE99/00123, filed on Jan. 19, 1999.

(30) Foreign Application Priority Data

Feb. 3, 1998 (DE) .......................................... 198 04 215
Oct. 8, 1998 (DE) .......................................... 198 46 459

(51) Int. Cl.[7] ................................................. G21C 9/00
(52) U.S. Cl. ........................ 376/283; 376/282; 376/307
(58) Field of Search ................................ 376/282, 283, 376/307

(56) References Cited

U.S. PATENT DOCUMENTS

| | | | |
|---|---|---|---|
| 3,095,012 A | 6/1963 | McShane ...................... | 138/30 |
| 3,114,414 A | 12/1963 | Judd ........................... | 165/234 |
| 3,212,565 A | 10/1965 | Esleeck ....................... | 138/30 |
| 3,417,815 A | 12/1968 | Van Den Honert .... | 165/104.25 |
| 3,722,578 A | 3/1973 | Frei et al. ...................... | 165/60 |
| 4,425,963 A | 1/1984 | Scholz et al. .......... | 165/104.32 |
| 4,717,532 A | 1/1988 | Schwab ....................... | 376/283 |
| 4,859,401 A | 8/1989 | Murase et al. .............. | 376/282 |
| 5,053,190 A | 10/1991 | Gardner et al. ............. | 514/167 |
| 5,491,731 A | 2/1996 | Corpora et al. ............. | 376/307 |
| 5,802,128 A | 9/1998 | Couturier ..................... | 376/283 |

FOREIGN PATENT DOCUMENTS

| | | |
|---|---|---|
| DE | 1 764 470 | 8/1971 |
| DE | 2 360 293 | 6/1974 |
| DE | 160 841 A | 4/1984 |
| EP | 0 212 488 | 3/1987 |
| JP | 02-83496 | 3/1990 |
| RU | 2096840 C1 | 11/1997 |

OTHER PUBLICATIONS

Nakano et al.: "Confirmation Test of Advanced Boron Injection Tank for Next Generation PWR", 6th International Conference on Nuclear Engineering, May 10–15, 1998.
"Pressurized Water Reactor", Power Union Brochure, Siemens AG.
Yamaguchi et al.: "Development of an Advanced Boron Injection Tank", Transactions of the American Nuclear Society, vol. 74, pp. 258–59.
Cinotti et al.: "The Inherently Safe Immersed System (ISIS) Reactor", Nuclear Engineering and Design, vol. 143, No. 2/03, Sep. 1, 1993, pp. 295–300.

*Primary Examiner*—Jack Keith
(74) *Attorney, Agent, or Firm*—Laurence A. Greenberg; Werner H. Stemer; Ralph E. Locher

(57) ABSTRACT

In order, in a pressure accumulator, to generate a required operating pressure of a fluid situated in the pressure accumulator, a heater device is provided, disposed in an upper region of the pressure accumulator. The device generates a vapor cushion and the required operating pressure. Where necessary, when the fluid flows out, the pressure in the pressure accumulator is automatically reduced after the level has fallen below a defined filling level, as a result of the vapor condensing at a cold insulating device with a high heat-accumulation capacity. The pressure accumulator is preferably used as an emergency shut-down tank or as an emergency accumulator in a nuclear power plant.

8 Claims, 4 Drawing Sheets

METHOD FOR PROVIDING A PRESSURIZED FLUID

CROSS-REFERENCE TO RELATED APPLICATION

This is a division of U.S. application Ser. No. 09/632,355, filed Aug. 3, 2000 now abandoned, which was a continuation of International Application No. PCT/DE99/00123, filed Jan. 19, 1999, which designated the United States.

BACKGROUND OF THE INVENTION

Field of the Invention

The invention relates to a method for providing a pressurized fluid for passing onto a downstream component of a plant, for example a nuclear power plant, in which the fluid is heated as a result of heat being supplied in the upper region of the pressure accumulator.

In nuclear plants, pressure accumulators are used, for example, as safety devices. They are used to provide a pressurized fluid which, for example in the event of an emergency, can be passed onto a downstream component. The downstream component is, for example, a control rod drive of a boiling-water reactor or the reactor pressure vessel of a nuclear power plant.

The brochure produced by Kraftwerk Union (Siemens A G), titled "Druckwasserreaktor" [Pressurized-Water Reactor], Order No. K/10567-01, August 1981 (DE) discloses a pressure accumulator for a pressurized-water reactor which provides boron-containing water for emergency cooling of the core. The pressure in the pressure accumulator is provided by a cushion of nitrogen. A dedicated nitrogen supply system is required for this purpose. The object of the pressure accumulator is to provide a certain amount of fluid at any time and over a period of years. It is a passive safety component that is only activated when required.

A first drawback of this configuration is that the cushion of nitrogen takes up a large volume, specifically up to three quarters of the total volume of the pressure accumulator. A second drawback is that over the course of time (generally several years) some of the nitrogen may become dissolved in the water. In the event of an emergency, for example for emergency cooling, water is fed out of the pressure accumulator into the reactor together with the nitrogen that is dissolved therein. Therefore, when required, the nitrogen results in that a non-condensable gas is introduced into the reactor, impairing, inter alia, the condensation of steam and therefore the effect of condensers or emergency condensers.

The above-mentioned brochure furthermore discloses a pressure vessel for a pressurized-water reactor that is used to set and maintain the operating pressure of the coolant in the reactor cooling system at a desired level. It compensates for changes in the temperature and volume of the coolant and is therefore constantly connected to the reactor cooling system via a compensation line. To regulate the operating pressure, it has both a heater device and a cooling device. The heater device is disposed in the lower region of the pressure vessel and heats all the water that is inside the pressure vessel.

To avoid the drawbacks associated with the cushion of nitrogen, the article "Development Of An Advanced Boron Injection Tank" by Kaori Yamaguchi et al., from "*Transactions of the American Nuclear Society*", 1996, volume 74, pages 258 to 259, discloses a pressure accumulator which is configured as a boron injection tank. The accumulator is completely filled with a boron solution and, in its upper region, has a heater device for heating the boron solution situated in that region. In this case, a pressure is built up in the pressure accumulator. When required, the boron solution from the pressure accumulator is injected into a reactor cooling system. In the process, there is initially a pressure drop in the pressure accumulator, leading to evaporation of the hot boron solution situated in the upper region. Therefore, the pressure only decreases slowly as the fluid flows out.

Owing to the considerable temperature differences between the cold fluid in the lower region and the hot fluid in the upper region, considerable thermal stresses may be imposed on the pressure accumulator as the fluid flows out. Moreover, there is generally a complex closure system that prevents the pressure accumulator from being fully emptied. This ensures that the hot fluid from the pressure accumulator does not pass into the pipeline that is connected to the pressure accumulator. The closure system is of a highly complex configuration, since it has to shut off the pipeline within a very short time and since it has to provide a very high closure force, owing to the possible pressure differences.

SUMMARY OF THE INVENTION

It is accordingly an object of the invention to provide a method for providing a pressurized fluid that overcome the above-mentioned disadvantages of the prior art devices and methods of this general type, in which a high operating reliability is ensured.

With the foregoing and other objects in view there is provided, in accordance with the invention, a pressure accumulator containing a closed vessel for a fluid and extending along a center axis from a lower region to an upper region, and the upper region also has a vapor chamber. A heater device is provided disposed in the upper region and has a heating capacity such that in the upper region the fluid can be evaporated even in a standby mode and a predetermined pressure can be maintained in the vapor chamber of the upper region.

According to the invention, the object relating to the pressure accumulator is achieved by the pressure accumulator, in which the heating capacity of the heater device is such that in the upper region fluid can be evaporated even in the standby mode, so that a predetermined pressure can be maintained in the vapor chamber formed in the upper region. The pressure can be set by the heating capacity.

As the operation of the pressure accumulator begins, the latter is not completely filled with the fluid, so that the vapor chamber is formed. During normal operation (standby mode), some of the fluid is evaporated by the heater device. In the process, a vapor cushion forms in the vapor chamber. The fluid is in particular water or a boron-containing water. There is no need for a cushion of nitrogen in order to build up the pressure. The fluid in the lower region remains cold and, when required, is used to control a downstream fitting. The so-called hot fluid passes out of the upper region into the lower region. The so-called cold fluid, which is situated in the lower region, flows out of the pressure accumulator into a pipeline that is connected to the latter. Therefore, as the fluid flows out, initially only cold fluid passes into the pipeline, so that the latter is protected from thermal stresses, since if a hot fluid, which is at a temperature close to boiling point, flows into the pipeline, the latter would be subjected to a shock-like thermal stress. Some of the hot fluid would evaporate on flowing into the pipeline, resulting in the formation of a two-phase flow. However, the fluid dynamics of a two-phase flow of this nature makes it more difficult to manage than a simple flow of liquid.

The advantage of the vapor cushion lies in the fact that the operating pressure can be easily set and also maintained at a desired level, for example at the level of the saturation pressure of steam. Since the vapor is compressible, a slight temperature rise does not lead to a disproportionate pressure increase, as is inevitably the case with a pressure accumulator which is completely filled with an incompressible liquid.

A further advantage is the small volume taken up by the vapor cushion. It forms only about one tenth of the total volume. Consequently, the pressure accumulator can be of very compact and inexpensive construction.

It is preferable to provide a level meter, which can be used to monitor the filling level of the fluid in the pressure accumulator both during filling and during the standby mode, in order to provide a suitable volume for forming the vapor cushion.

In an advantageous configuration, in the lower region an insulating device is provided on at least parts of the outer wall of the pressure accumulator, in particular on the inner side thereof.

The essential advantage of the insulating device is that it avoids direct contact between the hot fluid and the cold outer wall and therefore keeps the thermal stresses imposed on the latter at a low level. In principle, the insulating device can also be combined with a pressure accumulator that is known from the prior art, irrespective of the way in which the pressure is generated and maintained.

In a particularly preferred embodiment, the insulating device is configured to hold an insulating medium with a high heat-accumulation capacity, so that the hot fluid and the vapor, when they come into contact with the insulating device in the lower region, release some of their heat to the insulating medium.

If the heat-accumulation capacity is sufficiently great, it is possible to achieve the considerable advantage that the very complex closure system for the pipeline can be dispensed with. The insulating medium is able to take up sufficient heat from the vapor, so that the latter condenses and the pressure in the pressure accumulator is automatically reduced. The pressure in the pressure accumulator is preferably reduced to such an extent that it matches the pressure prevailing in the downstream component. Since there is no pressure difference, there is then substantially no possibility of the hot fluid flowing out into the pipeline and into the downstream component. A barrier may be required in order to allow maintenance work to take place, but this barrier may be configured as a simple main slide valve.

In a particularly expedient configuration, the insulating device has a partition, by which an outer chamber is formed between the outer wall of the vessel and the partition. The insulating medium can be introduced into the outer chamber. In particular, the insulating medium is the fluid with which the pressure accumulator is filled. During filing, it preferably passes automatically into the outer chamber.

In order for the outer chamber to be automatically filled with the fluid, it preferably has an opening at its top end, via which it is in communication with the remaining inner chamber, and otherwise forms a closed chamber.

As an alternative to the fluid, it is also possible to introduce another suitable insulating medium, for example a separate liquid or a solid with a particularly high heat-accumulation capacity, into the outer chamber. If appropriate, the outer chamber forms a completely closed chamber. The insulating medium may also be attached directly to the outer wall of the vessel, as the insulating device.

To achieve a sufficient pressure drop and therefore prevent hot fluid from flowing out, the volume of the outer chamber amounts to approximately 15 to 25%, and in particular approximately 18%, of the total volume of the vessel. The volume of the upper region preferably forms approximately 10 to 30%, and in particular 18%, of the total volume. This is sufficient to generate and maintain the required pressure. At the same time, this volumetric proportion ensures that as the fluid flows out the pressure in the pressure accumulator initially only drops slightly, in order to ensure that a sufficient quantity of fluid can be fed to the downstream component only when the amount of fluid that is intended for the component has left the pressure accumulator is the pressure reduced through the condensation of the vapor.

To produce the temperature distribution, it is advantageous to dispose the heater device substantially in a plane that is oriented perpendicular to the center axis, with the result that uniform, large-area heating is achieved in the upper region. The heater device is preferably electrically heatable.

In a preferred embodiment, the pressure accumulator is configured for an operating pressure of over 50 bar, and in particular for an operating pressure of 150 bar. This is advantageous for use in power-generation plants.

To keep the heating energy required as low as possible, the pressure accumulator is thermally insulated with respect to the outside at least in the upper region. In this way, the thermal losses are kept at a low level.

According to the invention, the object relating to the method is achieved by a method of the type described in the introduction in which, during the standby mode, some of the fluid is heated and evaporated in the only partially filled pressure accumulator, in order to generate and maintain the pressure, so that a vapor cushion is generated.

When required, for example in the event of an emergency involving a loss of coolant in a nuclear power plant, the fluid from the pressure accumulator is introduced into the reactor pressure vessel of the plant for cooling purposes. However, the fluid may also be provided as a drive fluid for shooting control rods into the reactor pressure vessel of a boiling-water reactor. As has already been mentioned above, if the vapor cushion is present, it is significantly easier to set and maintain the desired pressure level compared to a pressure accumulator that is completely filled with liquid.

To ensure that the downstream component is supplied with a sufficient amount of fluid and that the pressure in the pressure accumulator does not drop prematurely, in the standby mode the amount of hot fluid preferably approximately corresponds to the amount of fluid required by the downstream component. As a result, once the component is activated, the volume of fluid in the pressure accumulator is initially reduced only by the amount of hot fluid. This ensures that the vapor situated in the upper region initially only comes into contact with the outer wall that is heated by the hot fluid and is not condensed.

Preferably, a non-condensable gas is admixed with the fluid. In this way, the temperature stresses on the pipeline are reduced, since the non-condensable gases gather at the cold walls and slow down the transfer of heat between the hot fluid and the pipe wall considerably. They form, as it were, an insulating layer. However, the non-condensable gases should only be admixed with the fluid in small amounts, so that the partial pressure of the non-condensable gases in the pressure accumulator does not exceed about 2 bar. If the amount of non-condensable gases is too high, the functioning of condensers or emergency condensers would be impaired.

Preferably, the control rods of a reactor of a boiling-water nuclear power plant are activated by the pressurized fluid from the pressure accumulator. The pressure accumulator is therefore preferably used as a so-called emergency shut-off tank in a boiling-water nuclear power plant.

Alternatively, the fluid is expediently fed as emergency cooling water to an emergency cooling system of a pressurized-water nuclear power plant. Accordingly, the pressure accumulator is preferably used as a so-called accumulator for the emergency cooling water in a pressurized-water nuclear power plant.

Other features which are considered as characteristic for the invention are set forth in the appended claims.

Although the invention is illustrated and described herein as embodied in a method for providing a pressurized fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
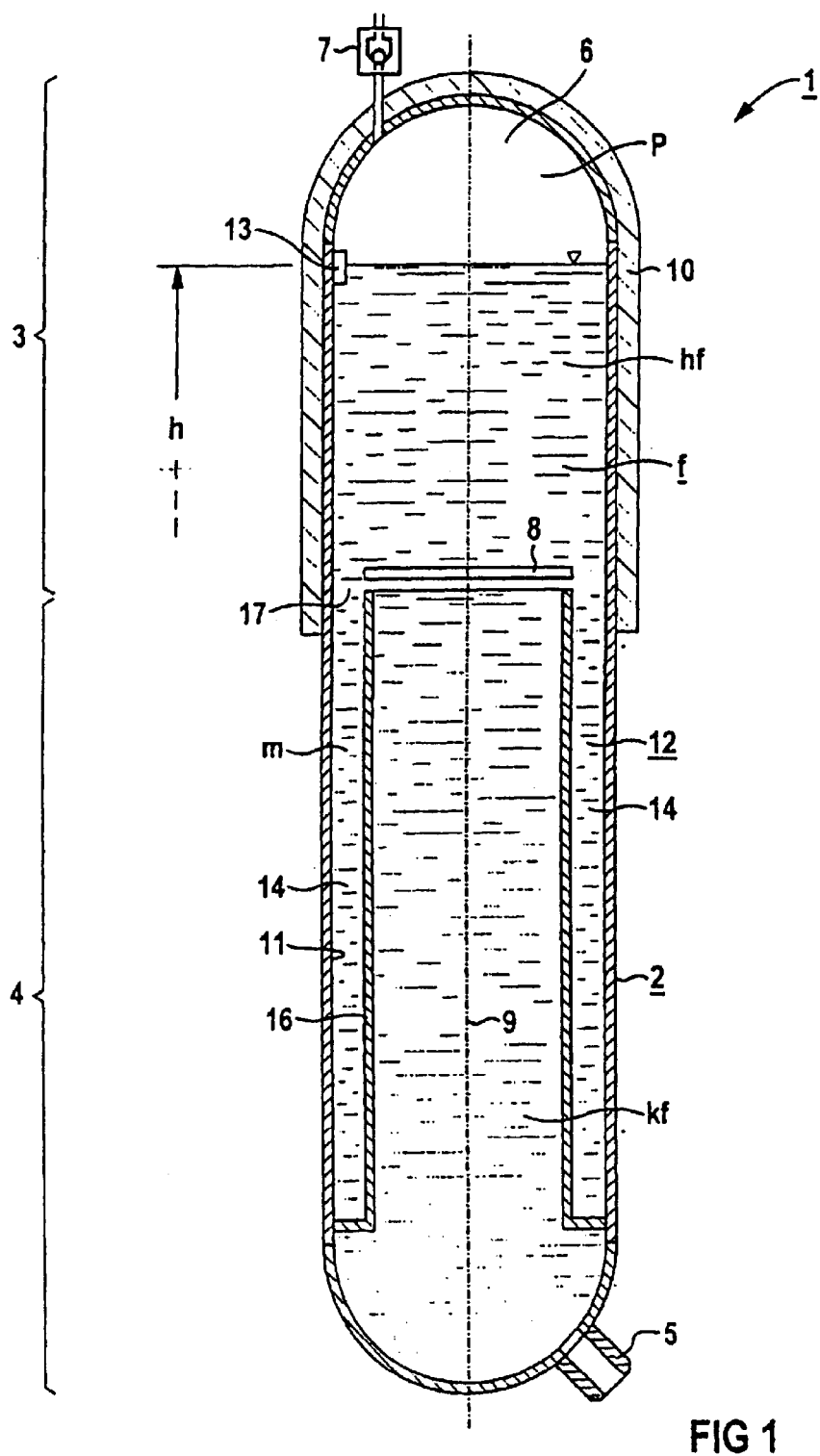
FIGS. 1–3 are diagrammatic, longitudinal sectional views through a pressure accumulator in different operating states according to the invention.

In all the figures of the drawing, sub-features and integral parts that correspond to one another bear the same reference symbol in each case. Referring now to the figures of the drawing in detail and first, particularly, to FIG. 1 thereof, there is shown a pressure accumulator 1. The pressure accumulator 1 contains a closed, upright vessel 2 having an upper region 3 and a lower region 4 that is about ⅔ of the volume of the vessel. The vessel 2 is filled with a fluid f up to a filling level h. A level meter 13 is provided in order to accurately set the filling level h while the pressure accumulator 1 is being filled with the fluid f and to monitor the filling level h during the standby mode. In accordance with FIG. 1, the level meter 13 is a sensor that measures whether the desired filling level h is maintained. Alternatively, the level meter 13 may also be formed, for example, in the manner of a communicating tube as a riser that is in communication with the pressure accumulator 1. In this way, it is possible to determine the filling level h over the entire filling region.

The fluid f is, for example, water or a boron-containing water. At its bottom end, the vessel 2 has an outlet 5. Where necessary, for example before starting operation or after the fluid f has been released from the pressure accumulator 1, the outlet 5 can also be used as a filling opening, via which the fluid f is introduced into the pressure accumulator 1. In the normal operating mode of the pressure accumulator 1 (standby mode), the outlet 5 is closed off by a non-illustrated valve.

A vapor chamber 6 is formed above the filling level h in order to hold vapor. During filling of the vessel 2 with cold water, it still holds, for example, air or nitrogen at atmospheric pressure, and at least after the filling operation has been completed it is closed off from the environment as a result of a valve 7 being closed. This ensures that the partial pressure of non-condensable gases, such as nitrogen, in the operating mode does not exceed 2 bar. The fluid f preferably takes up a large part of the volume of the vessel 2, whereas the vapor chamber 6 takes up only a small volume, for example about one tenth of the total volume of the vessel 2.

The vapor chamber 6 is in communication with the environment via the valve 7, so that vapor can be blown off and the pressure in the pressure accumulator 1 can be reduced. Normally, pressure accumulators in a nuclear power plant are set to a maximum pressure during start-up of the nuclear power plant, and this maximum pressure does not necessarily correspond to a normal operating pressure. During start-up of the nuclear power plant, the pressure in the pressure accumulator 1 can easily be changed by selecting a suitable heating capacity of a heater device 8 or by blowing off the vapor.

Alternatively, the level meter 13 may also, for example, be configured in the manner of a communicating tube as a riser that is in communication with the pressure accumulator 1. In this way, it is possible to determine the filling level over the entire filling region.

The heater device 8 is provided in the upper region 3. In principle, it can be disposed inside or outside the pressure accumulator 1. In the case of a heater device disposed on the outside, energy is fed to the fluid f for example by electromagnetic radiation or by radiant heat. In the case of the heater device 8 disposed on the outside, there is no need for any supply lines to lead into the pressure accumulator 1. Preferably, the heater device 8 is configured in such a manner that there is no mass exchange with the fluid f and the amount of the fluid f in the pressure accumulator 1 remains constant.

In the exemplary embodiment shown in FIG. 1, the heater device 8 is disposed in an interior of the vessel 2, and in particular in a plane that extends perpendicular to a center axis 9. The heater device 8 is therefore disposed horizontally and substantially parallel to the surface of the fluid f and is formed, for example, from electrically heatable heater elements. It is preferably configured in such a manner that it only emits heat upward. Alternatively, the heater device 8 may also be formed by a heat exchanger which contains, for example, heater tubes through which hot vapor can flow.

At the upper region 3, in which the heater device 8 and the vapor chamber 6 are disposed, the vessel 2 is thermally insulated with respect to the outside by an insulating jacket 10. The insulating jacket 10 is not necessarily restricted to the upper region 3.

An insulating device 12 is provided in the lower region 4, on an inner side 11 of the outer wall of the vessel 2. This device is substantially formed by a partition 16 that is at a distance from the outer wall of the vessel 2 and, together with the latter, forms an outer chamber 14. At its bottom end, the partition 16 is connected to the wall of the vessel 2, so that the outer chamber 14 is closed off at the bottom. At its top end, the outer chamber 14 is open and is flow-connected to the fluid f via an opening 17, so that the outer chamber 14, during operation of the pressure accumulator 1, is filled with the fluid f, which acts as an insulating medium m. The partition 16 can be regarded as an annular skirt that is open at the top. The insulating device 12 protects the inner side 11 from thermal stresses. In principle, the insulating device 12 can also be provided for the entire vessel 2.

The pressure in the pressure accumulator 1 is built up as a result of the heater device 8 heating and partially evaporating the fluid f in the upper region 3. In the upper region 3, the fluid f is in the form of a hot fluid hf, and the vapor cushion p forms in the vapor chamber 6. In the lower region 4, the fluid f is in the form of a cold fluid kf, the transition to the hot fluid hf being gradual. The temperature decreases toward the bottom, in the direction of the center axis 9, and a steady-state temperature profile is formed.

The desired operating pressure in the pressure accumulator 1 is preferably set as the saturation pressure of the hot fluid hf. The hot fluid hf is in particular saturated water. The saturation pressure is regulated by supplying thermal energy through the heater device 8. When the operating pressure is reached, all that is necessary is for the thermal losses, for example resulting from radiant heat, to be compensated for by supplying a suitable amount of heat. The thermal losses are kept at a low level by the insulating jacket 10. Measuring and control devices (not shown in more detail) may be provided in order to set the pressure.

FIG. 1 shows the normal operating mode of the pressure accumulator 1, at which the fluid is held at a desired operating pressure, for example 130 bar.

Figure 2:
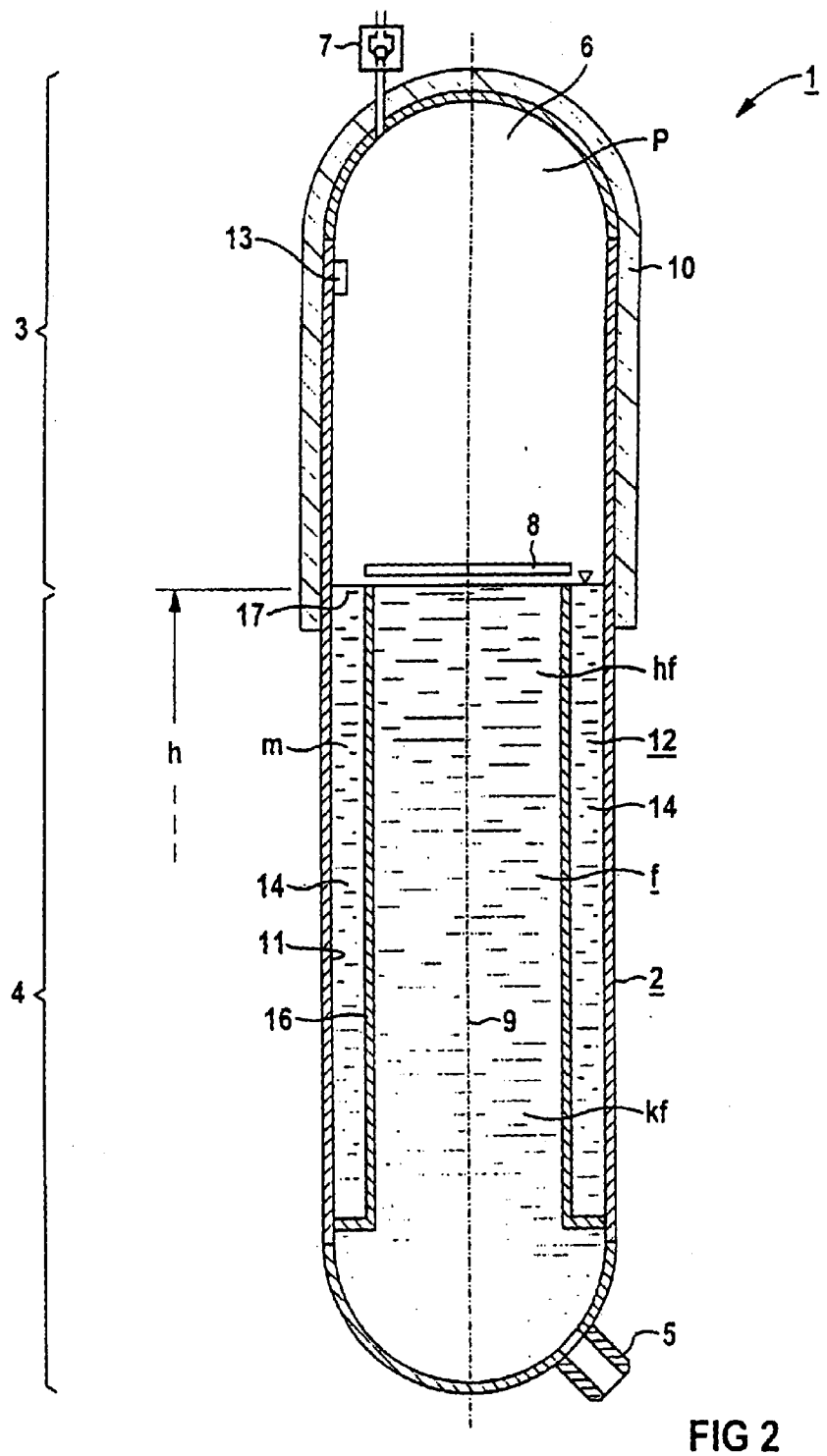
Figure 3:
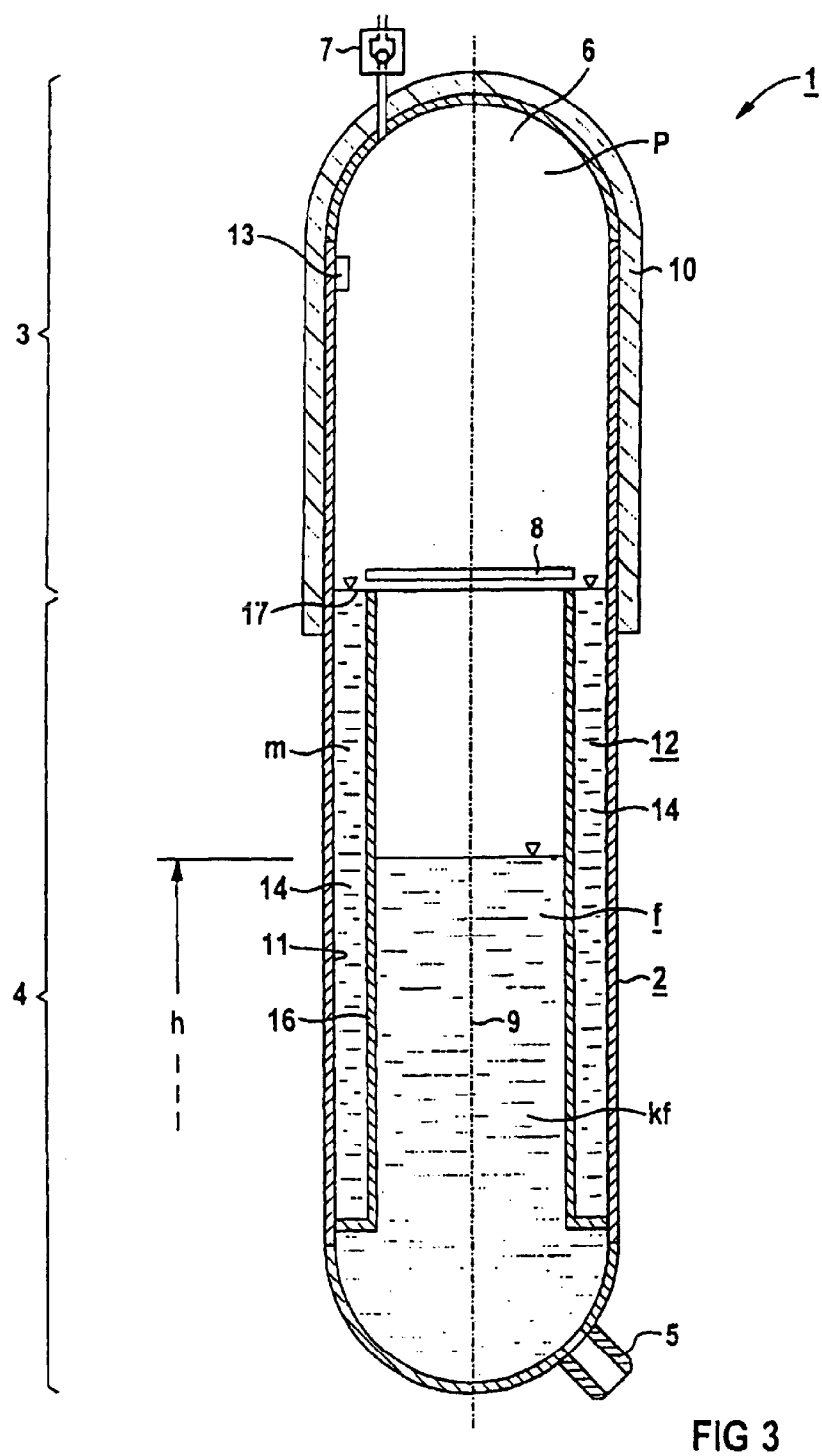

FIGS. 2 and 3 show operating modes when, as required, the fluid f, in particular the cold fluid kf, has already flown out of the pressure accumulator 1 and has been passed onto a downstream component. The downstream component is, for example, a control rod drive 27 of a boiling-water reactor (see FIG. 4).

The total amount of the fluid f is such that only some of the fluid is required for the downstream component, in order to prevent the pressure accumulator 1 from becoming empty. As a result of the fluid f flowing out, the pressure in the pressure accumulator 1 drops, so that additional hot fluid hf is evaporated. This effect prevents an excessively rapid pressure drop.

Furthermore, the volume required, for example in order to move in control rods 26, preferably approximately corresponds to the volume of the hot fluid hf. After the control rods 26 have been moved in, and therefore no further fluid f is required for the control rod drive 27, the filling level h has only fallen to an upper end of the insulating device 12. The vapor cushion p therefore only comes into contact with that area of the outer wall that has previously been heated by the hot fluid hf. This prevents the vapor from being condensed on cold walls, leading to an undesirable, premature pressure drop. By way of example, the pressure only falls from 130 bar to 100 bar. This represents an adequate excess pressure to enable the operation of shooting in the control rods to be reliably completed (FIG. 2).

Owing to the pressure difference which for the time being continues to exist, once the control rods 26 have been shot in, the fluid f flows past the control rods 26 via leakage openings into a reactor pressure vessel 20a. The filling level h in the pressure accumulator 1 therefore falls further in the interior of the pressure accumulator 1, as shown in FIG. 3. By contrast, the outer chamber 14, which is formed by the partition 16, remains filled with the fluid f as the insulating medium m. The vapor cushion p comes into contact with the partition 16, which is cooled by the insulating medium m, and is condensed on the partition, so that the pressure in the pressure accumulator 1 drops. The amount of the insulating medium m is such that sufficient vapor can be condensed. As a result, a sufficient pressure drop is achieved, so that the further flow of fluid out of the pressure accumulator 1 is avoided. In particular, the hot fluid hf is prevented from flowing out.

In this context, the volume of the outer chamber 14 amounts, for example, to approximately 20% of the total volume of the pressure vessel 1. At the same time, the heater device 8 is disposed in such a manner, and its heating capacity is such, that the volume of the hot fluid hf and the volume of the vapor cushion p, in the normal operating mode, together likewise take up approximately 20% of the total volume of the pressure accumulator 1. The hot fluid hf taking up twice as much volume as the vapor cushion p. In the present example, in the operating mode shown in FIG. 3, by way of example the pressure is then only about 70 bar and thus corresponds to the pressure in the reactor pressure vessel 20a so that no further fluid f flows out of the pressure accumulator 1. The pressure accumulator 1 should be dimensioned in such a way that the pressure therein can also be reduced automatically to about 20 bar. This is important for situations in which the pressure in the reactor pressure vessel 20a falls, for example as a result of an emergency involving loss of coolant. The volumetric ratios indicated are particularly advantageous for the exemplary embodiment involving the emergency shut-down of a boiling-water reactor. For other applications, volumetric ratios that differ from those given above may be more advantageous.

Figure 4:
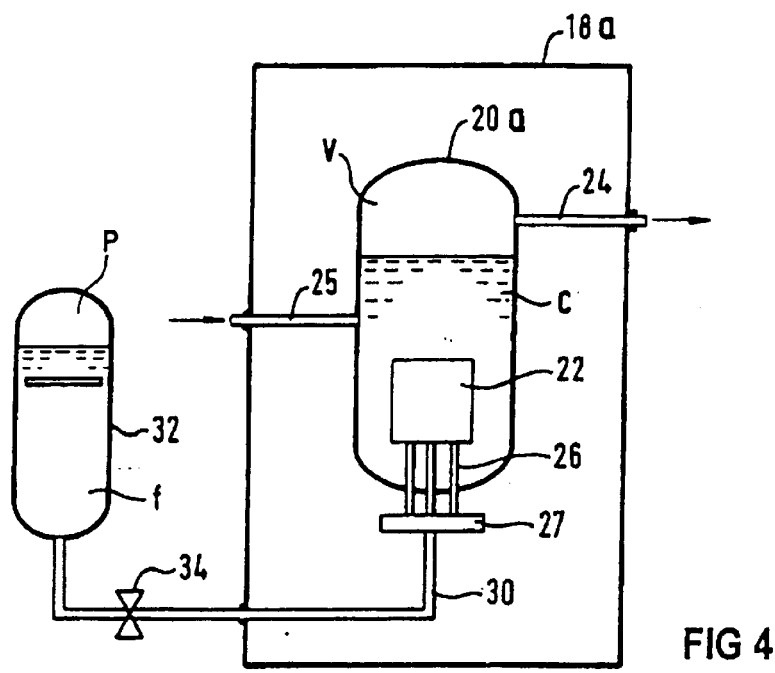
FIG. 4 is an illustration of an excerpt of a boiling-water nuclear power plant, with the pressure accumulator as an emergency shut-off tank.

FIG. 4 shows a diagrammatic excerpt from a boiling-water nuclear power plant. The above-mentioned reactor pressure vessel 20a, with a core area 22, is disposed in a containment shell 18a. The reactor pressure vessel 20a is partially filled with a cooling liquid c. Above the cooling liquid c there is vapor v, which is passed out of the containment shell 18a, via a vapor line 24, to a non-illustrated turbine. The cooled cooling liquid c is fed back to the reactor pressure vessel 20a via a line 25 for the cooling liquid c. The performance of the nuclear reactor can be regulated by moving the control rods 26 into and out of the core area 22. The control rods 26 are moved by the control rod drive 27 that has already been mentioned above.

The control rod drive 27 is connected, via a control line 30, to an emergency shut-down tank 32 which is disposed, for example, outside the containment shell 18a. The emergency shut-down tank 32 largely corresponds to the pressure accumulator 1 which has been described with reference to FIGS. 1 to 3. For the emergency shut-down, it is also possible to provide a plurality of emergency shut-down tanks 32.

If a significant operating fault in the nuclear power plant makes emergency shut-down of the reactor necessary, a valve 34 is opened. The pressurized fluid f which is situated in the emergency shut-down tank 32 acts on the control rod drive 27 via the control line 30, so that the control rods 26 are moved into the core area 22. In an emergency of this type, it is important that the minimum possible amount of non-condensable gases passes into the reactor pressure vessel 20a via the control line 30. This is because as the amount of non-condensable gases in the reactor pressure vessel 20a increases, the ability to condense against the cold emergency cooling water which has been fed in is reduced.

Figure 5:
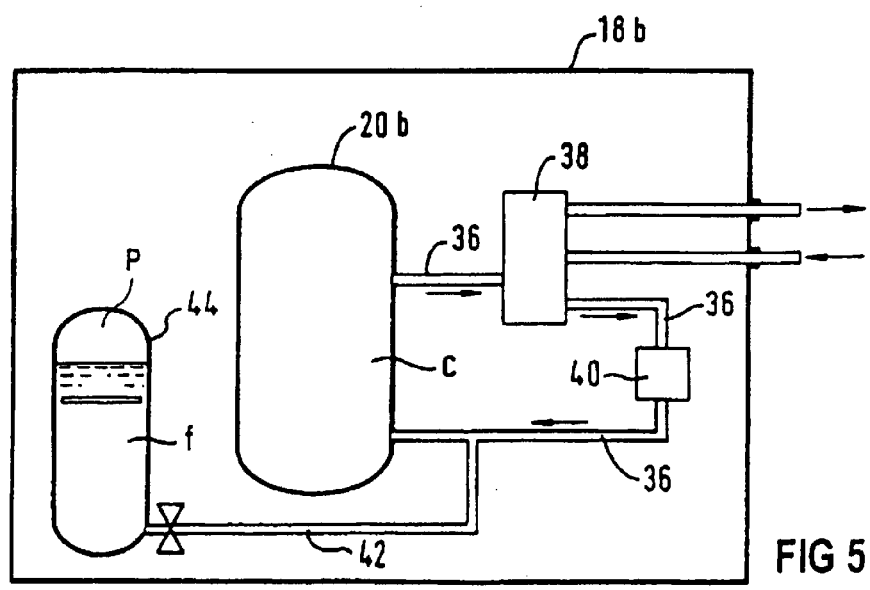
FIG. 5 is an illustration of an excerpt of a pressurized-water nuclear power plant, having the pressure accumulator as an accumulator for emergency cooling water.

FIG. 5 shows a diagrammatic excerpt from a pressurized-water nuclear power plant. A reactor pressure vessel 20b is disposed in a containment shell 18b. The cooling liquid c that is heated in the reactor pressure vessel 20b is guided in a primary circuit 36. It leaves the reactor pressure vessel 20b and is fed to a steam generator 38, where it is cooled and is then fed back to the reactor pressure vessel 20b via a coolant circulation pump 40.

An emergency cooling line 42, which is connected to an emergency accumulator 44, is also connected to the primary circuit 36. The emergency accumulator 44 largely corresponds to the pressure accumulator 1 shown in FIGS. 1 to 3. By way of example, the fluid f in the emergency accumulator 44 is boron-containing water. In the case of an emergency involving a loss of coolant, the pressurized fluid f can be fed directly into the primary circuit 36 and therefore into the reactor pressure vessel 20b via the emergency cooling line 42.

The novel pressure accumulator 1 and the associated method make it possible, preferably in power plant areas and in particular in the event of emergencies, to reliably supply a part of the plant with the fluid f, while requiring only little outlay and using simple construction.

We claim:

1. A method for providing a pressurized cooling medium to be passed to a downstream component, which comprises the steps of:

providing a pressure accumulator partially filled with a cooling medium;

heating the cooling medium by supplying heat to an upper region of the pressure accumulator, and during normal operation before the occurrence of an incident, evaporating some of the cooling medium in the pressure accumulator for generating and maintaining a pressure, and for generating a vapor cushion.

2. The method according to claim 1, which comprises supplying the heat such that the vapor cushion is followed by a hot-medium region containing a hot cooling medium formed from heating the cooling medium, and the hot-medium region is in turn followed by a cold-medium region containing a cold cooling medium from the cooling medium, a ratio of a volume of the hot-medium region to a volume of the vapor cushion being approximately 2:1, the volume of the hot-hot-medium region and the volume of the vapor cushion forming approximately 10%–30% of a volume of the pressure accumulator.

3. The method according to claim 2, which comprises setting the volume of the hot-medium region and the volume of the vapor cushion to be 18% of the volume of the pressure accumulator.

4. The method according to claim 2, which comprises setting an amount of the hot medium to approximately correspond to an amount of the cooling medium required by the downstream component.

5. The method according to claim 2, which comprises reducing the pressure in the pressure accumulator during a passing on of the cooling medium to the downstream component, resulting in a lowering of a cooling medium level of the cooling medium in the pressure accumulator, the pressure reduction occurring due to the hot cooling medium and a vapor of the vapor cushion being cooled in a lower region of the pressure accumulator due to a releasing of heat to an insulating device disposed in the lower region.

6. The method according to claim 1, which comprises admixing a non-condensable gas with the cooling medium.

7. The method according to claim 1, which comprises conducting the cooling medium to a control rod drive of a reactor of a boiling-water nuclear power plant.

8. The method according to claim 1, which comprises conducting the cooling medium as emergency cooling water to an emergency cooling system of a pressurized-water nuclear power plant.

* * * * *